United States Patent

Kobayashi et al.

[11] Patent Number: 5,887,896
[45] Date of Patent: Mar. 30, 1999

[54] REINFORCED FRONT SUSPENSION STRUCTURE OF MOTOR VEHICLE

[75] Inventors: Kenju Kobayashi, Yokohama; Hiroyuki Fujiki, Odawara, both of Japan

[73] Assignee: Nissan Motor Co., Ltd., Yokohama, Japan

[21] Appl. No.: 712,605

[22] Filed: Sep. 13, 1996

[30] Foreign Application Priority Data

Sep. 26, 1995 [JP] Japan .................................. 7-247947

[51] Int. Cl.⁶ .................................................. B62D 21/00
[52] U.S. Cl. .......................................... 280/781; 280/784
[58] Field of Search .................................. 280/781, 784, 280/124.109

[56] References Cited

U.S. PATENT DOCUMENTS 4,817,986  4/1989  Kanazawa et al. ..................... 280/781
5,118,131  6/1992  Manning ................................. 280/713
5,375,873  12/1994 Thackray ................................ 280/712
5,429,388  7/1995  Wheatley et al. ...................... 280/784

FOREIGN PATENT DOCUMENTS 7-205833  8/1995  Japan .

*Primary Examiner*—Charles T. Jordan
*Assistant Examiner*—M J Lattig
*Attorney, Agent, or Firm*—Foley & Lardner

[57] ABSTRACT

From opposed ends of a front frame, there extend right and left side frames. A front suspension structure is arranged behind the front frame and located between the right and left side frames. The front suspension structure includes a front member which extends between respective lower portions of the right and left side frames. The front member has a steering gear mounted thereon. A reinforcing structure extends between the front frame and the front member to reinforce the front suspension structure against an external force suddenly applied to the front member.

10 Claims, 5 Drawing Sheets

FRONT

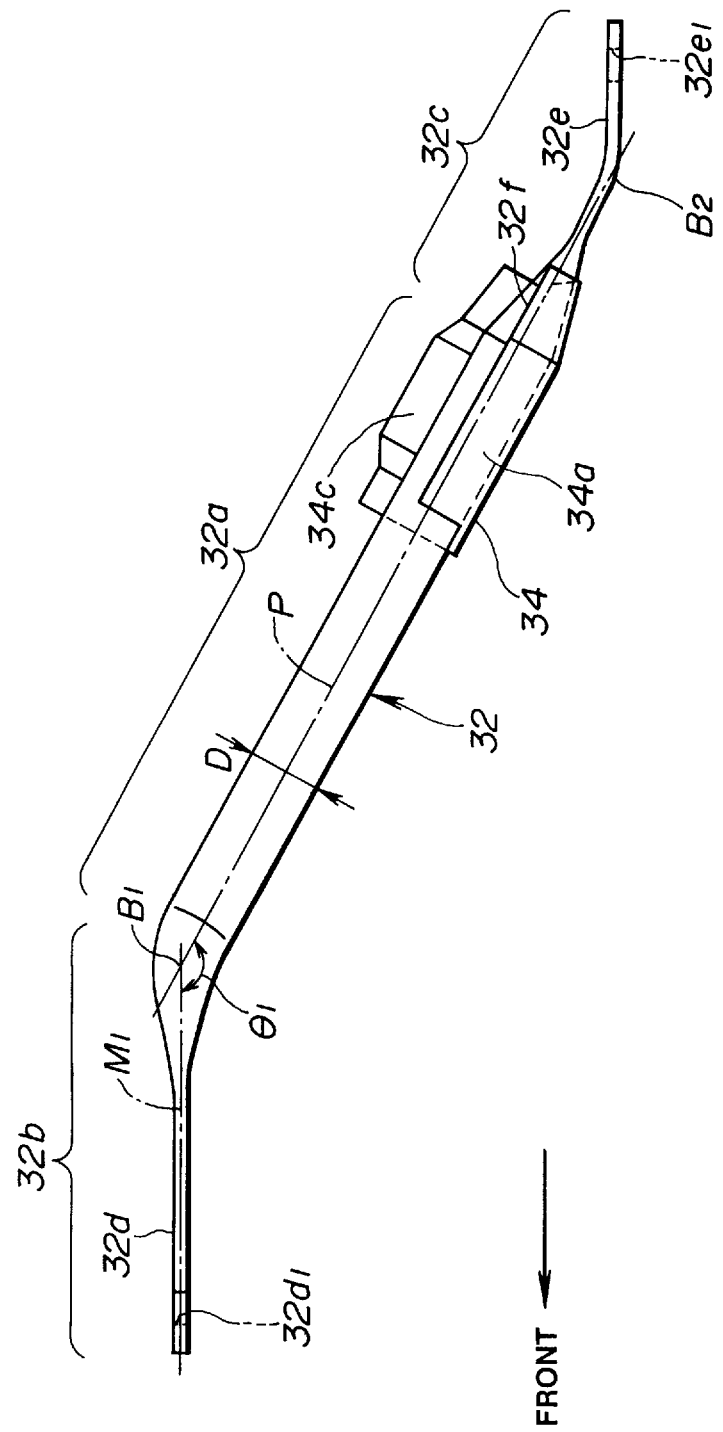

REINFORCED FRONT SUSPENSION STRUCTURE OF MOTOR VEHICLE

BACKGROUND OF THE INVENTION

1. Field of the Invention

The present invention relates to a front suspension structure for use in front engine cab-over type motor vehicles, off road type four wheel drive motor vehicles and the like, and more particularly, to the front suspension structures of a type having a front member on which a steering gear of rack-and-pinion type is mounted.

2. Description of the Prior Art

One of the front suspension structures of the above-mentioned type is shown in Japanese Patent First Provisional Publication 7-205833.

The front suspension structure of this publication comprises generally front and rear members which extend in the direction of the width of a vehicle, and a pair of side members which extend in the direction of the length of the vehicle to connect opposed ends of the front member with those of the rear member. With this, the structure has a generally rectangular shape. Each side member has a front end vertically spaced from the front member, and thus a vertically extending connecting member is disposed therebetween for connecting the front end and the front member. On the front member, there is mounted a steering gear of rack-and-pinion type. A (front) differential gear is arranged behind the steering gear.

With adoption of this front suspension structure, the steering gear can be easily mounted on the front member without giving special consideration to the positional relationship between the differential gear and the steering gear and to the position where suspension links are arranged.

However, due to its inherent construction, the above-mentioned front suspension structure has failed to satisfy users to the full. In fact, when the vehicle is running on a rough road, it tends to occur that the front member of the front suspension structure bumps strongly against projected things on the road. Thus, in a severe case, the front member becomes largely deformed. In this case, the steering gear on the front member is damaged.

SUMMARY OF THE INVENTION

It is therefore an object of the present invention to provide a front suspension structure which is free of the above-mentioned drawback.

According to the present invention, there is provided a front suspension structure which is constructed to prevent severe deformation thereof even when a front member thereof bumps against projected things on a road during cruising of the vehicle.

According to the present invention, there is provided a front suspension structure which, upon a head-on collision of the associated vehicle, can effectively absorb the collision energy.

According to the present invention, there is provided a combination for use in a motor vehicle which has a laterally extending front frame, right and left side frames which respectively extend rearward from laterally opposed ends of said front frame, and a steering device by which front road wheels are steered. The combination comprises a front suspension structure arranged behind the front frame and located between the right and left side frames, the front suspension structure including a front member which extends between respective lower portions of the right and left side frames, the front member having a steering gear of the steering device mounted thereon; and a reinforcing structure extending between the front frame and the front member to reinforce the front suspension structure against an external force applied to the front member.

BRIEF DESCRIPTION OF THE DRAWINGS

Other objects and advantages of the present invention will become apparent from the following description when taken in conjunction with the accompanying drawings, in which:

FIG. 5 is a side view of the reinforcing structure.

DETAILED DESCRIPTION OF THE INVENTION

Figure 1:
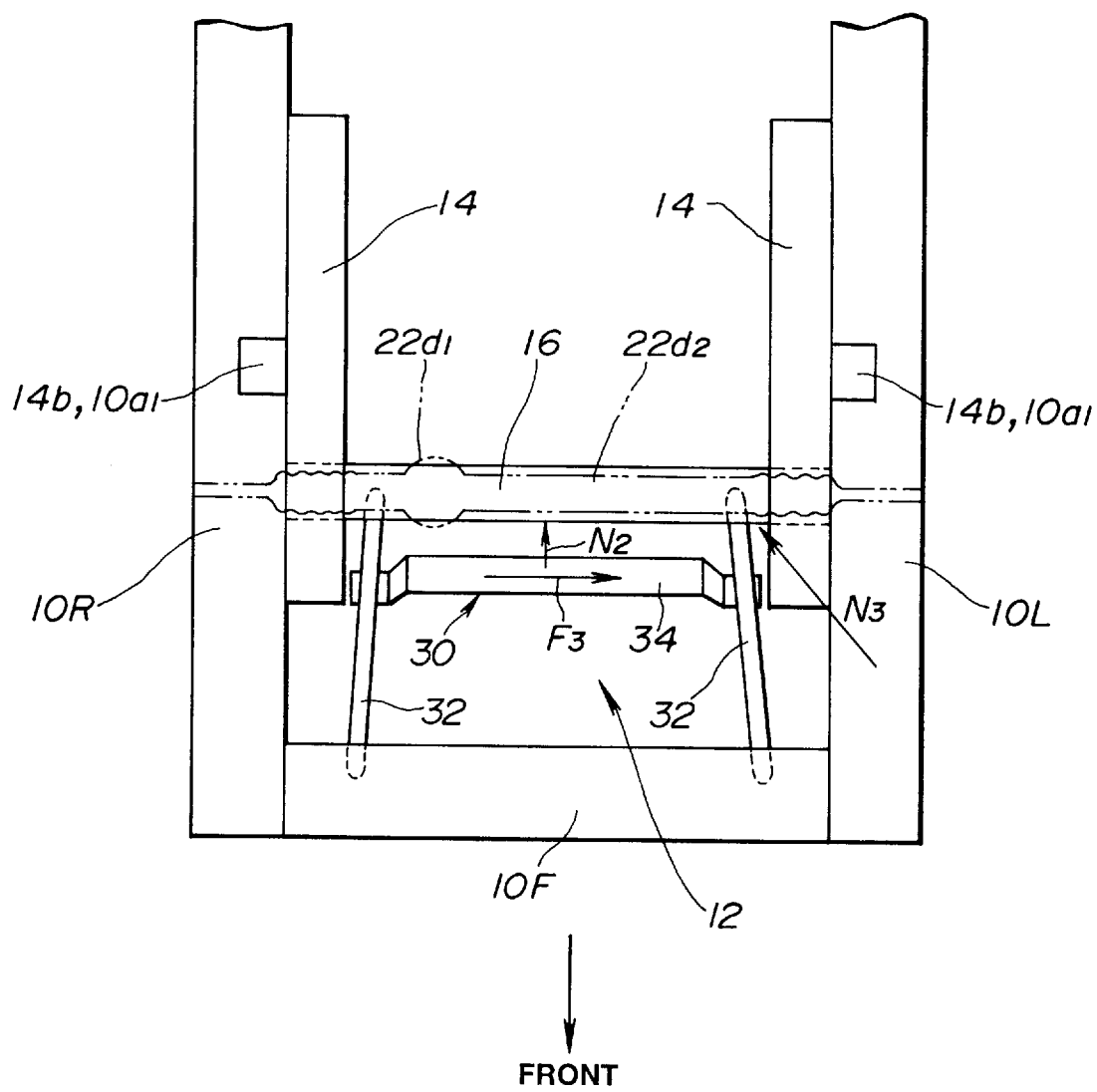
FIG. 1 is a plan view of a motor vehicle front body structure with which a front suspension structure of the present invention is associated.

Referring to FIG. 1, there is shown a front body structure of a motor vehicle, with which a front suspension structure 12 of the present invention is incorporated. For ease of understanding, throughout the specification, the terms "front", "rear", "right", "left" and the like are used with respect to a driver who is driving the associated motor vehicle.

In the drawing, denoted by numerals 10R and 10L are right and left side frames of the front body structure of the motor vehicle. A front frame 10F extends between respective front ends of the right and left side frames 10R and 10F, as shown.

The front suspension structure 12 is supported by the right and left side frames 10R and 10L and the front frame 10F in such a manner as will be described in the following.

Figure 2:
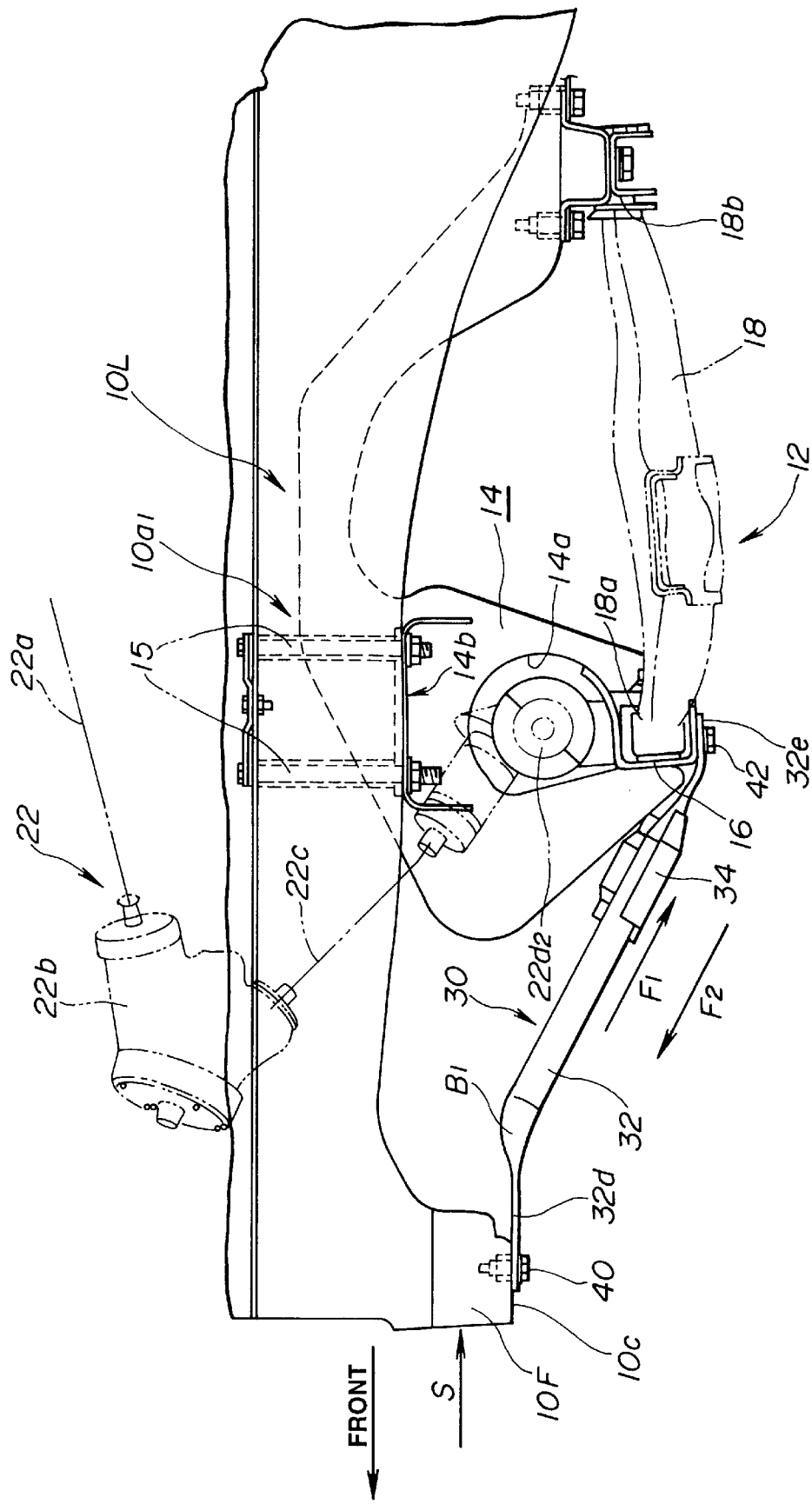
FIG. 2 is a left side view of the motor vehicle front body structure, showing the front suspension structure of the invention.

As is seen from FIG. 2, lateral end portions of the front frame 10F have respective lower walls 10c each having a bolt hole formed therethrough. As is understood from FIGS. 1 and 2, from the respective lower walls 10c, there extend right and left reinforcing members 32 (see FIG. 1) rearward and downward, that is, toward the front suspension structure 12.

As is seen from FIG. 1, the front suspension structure 12 comprises right and left side members 14 and 14 which extend along respective inner walls of the right and left side frames 10R and 10L and are secured thereto. As shown in FIG. 2, each side member 14 has a reversed U-shaped structure. That is, each side member 14 has an enlarged front portion projected downward. Between lower ends of the enlarged front portions of the two side members 14 and 14, there extends a front member 16. The front member 16 has a rack-and-pinion type steering gear 22d of a steering device 22 mounted thereon.

As is seen from FIG. 2, the enlarged front portion of each side member 14 is formed with a recess 14a which extends downward. Lateral ends of the front member 16 are received in lower narrower portions of the recesses 14a and secured thereto by means of bolts (no numerals). With this, the front member 16 extends transversely with respect to the vehicle body, while being supported tightly by the side members 14.

Figure 3:
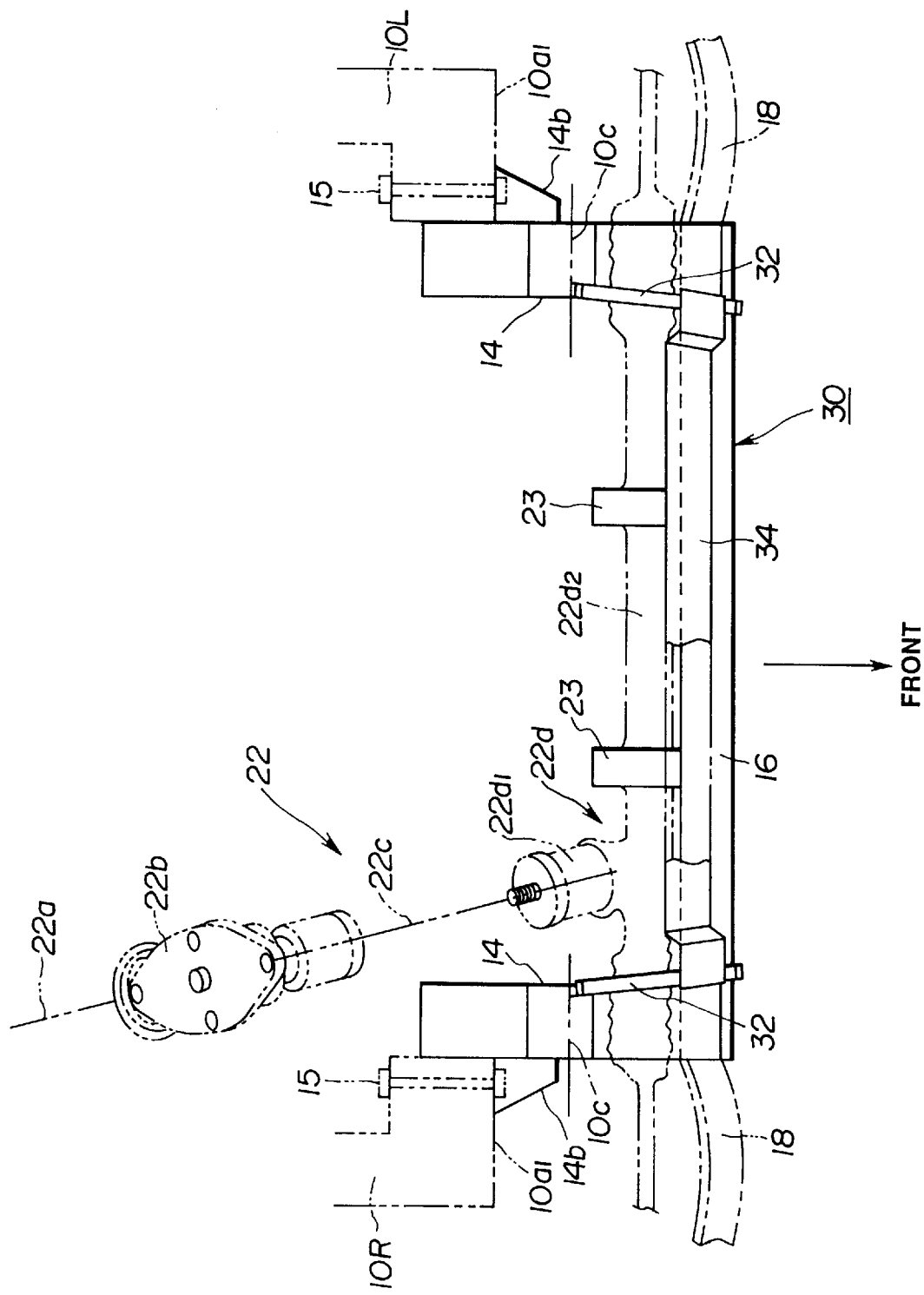
FIG. 3 is a front view of the front suspension structure of the present invention, with some parts of the vehicle body.

As is seen from FIGS. 1, 2 and 3, brackets 14b are each secured to an outer surface of an upper part of the enlarged front portion of the side member 14. As seen from FIG. 2, each bracket 14b is formed with two bolt holes and abuts against a lower end of a swelled structure 10a1 provided on an inner surface of the side frame 10L or 10R. Each bracket 14b is secured to the lower end of the swelled structure 10a1 by means of two bolts 15 which pass through the swelled structure 10a1 and the bolt holes of the bracket 14b and are fastened by nuts (no numerals). With this, the enlarged front portions of the side members 14 are secured to the corresponding side frames 10L and 10R of the motor vehicle.

As is understood from FIGS. 2 and 3, each lateral end of the front member 16 has a rectangular opening with which a front end 18a of a lower link 18 is pivotally connected through an elastic member (no numeral). A rear end 18b of each lower link 18 is pivotally connected to a rear portion of the corresponding side member 14 through a bracket (no numeral) and an elastic member (no numeral).

As is understood from FIGS. 2 and 3, the steering device 22 held in the front portion of the motor vehicle comprises a first steering column 22a which extends from a steering wheel (not shown), a transfer gear 22b which is positioned in front of and above the front member 16 and engaged with a lower end of the first steering column 22a, and a second steering column 22c which extends from the transfer gear 22b toward the above-mentioned rack-and-pinion type steering gear 22d which is mounted on the front member 16 of the front suspension structure 12.

As is seen from FIG. 3, the steering gear 22d comprises a pinion 22d1 which is engaged with the second steering column 22c and a rack 22d2 which extends laterally along the front member 16. Two mounting members 23 are used for fixing a tubular case of the rack 22d2 to the front member 16. When, due to rotation of the steering wheel, the second steering column 22c is rotated, the pinion 22d1 is rotated. With this, the rack 22d2 is moved laterally in one or the other direction for steering front road wheels (not shown).

As is well seen from FIG. 1, between the front frame 10F and the front member 16, there is arranged a reinforcing structure 30 which employs the above-mentioned right and left reinforcing members 32 as essential parts.

Figure 4:
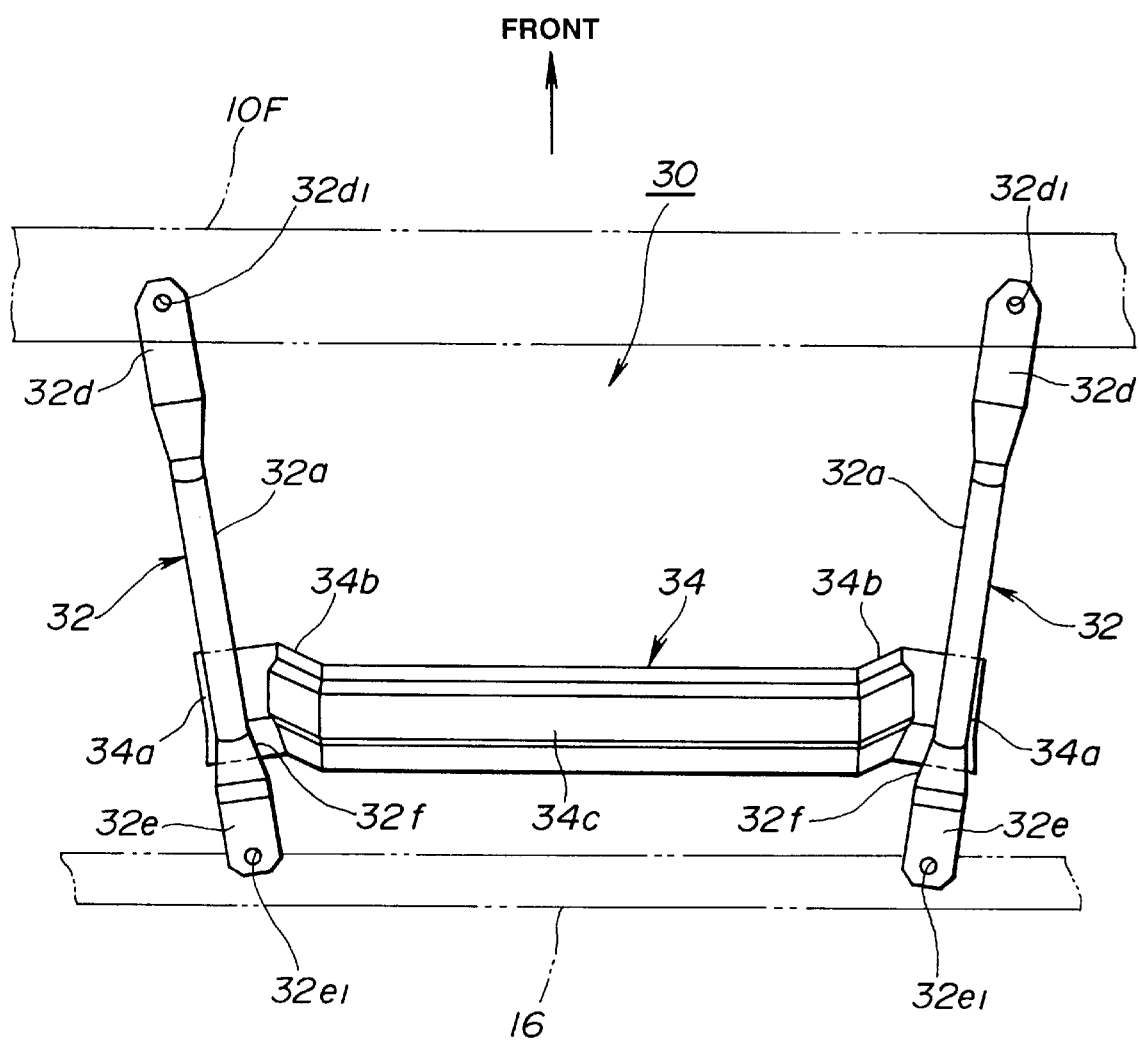
FIG. 4 is a plan view of a reinforcing structure employed for reinforcing the front suspension structure of the invention.

As is best shown in FIG. 4, the reinforcing structure 30 comprises the spaced right and left reinforcing members 32 and a transverse reinforcing member 34 which extends between the right and left reinforcing members 32. Thus, these three reinforcing members 32 and 34 are assembled to have a generally H-shaped structure, as shown. More specifically, the right and left reinforcing members 32 are angled to each other so that a distance therebetween gradually decreases as a position approaches the rear end of the corresponding reinforcing member 32.

As is understood from FIG. 5, each of the right and left reinforcing members 32 is of a tubular metal member and comprises a tubular major portion 32a which has a certain outer diameter "D", a pressed front portion 32b which has a flattened front end 32d and a pressed rear portion 32c which has a flattened rear end 32e. That is, the pressed front portion 32b is provided by bending the reinforcing member 32 at the point "B1". As shown, the pressed front portion 32b is somewhat swelled near the point "B" and gradually flattened as the distance from the point "B" increases. The flattened front end 32d is formed with a bolt hole 32d1.

Designated by "P" in FIG. 5 is an axis of the tubular major portion 32a, and designated by "M1" is an imaginary surface which extends through the center of the thickness of the flattened front end 32d and intersects an axis of the bolt hole 32d1 at right angles. It is to be noted that the point "B1" indicates the position where the axis "P" of the tubular major portion 32a and the imaginary surface "M1" intersect at a given obtuse angle of "θ1".

As shown, the pressed rear portion 32c is somewhat swelled at a junction portion 32f thereof with the tubular major portion 32a and gradually flattened as the distance from the junction portion 32f increases. The flattened rear end 32e is bent at the point "B2" in a direction opposite to the above-mentioned flattened front end 32d of the pressed front portion 22b, so that the flattened rear and front ends 32e and 32d extend in parallel with each other. The flattened rear end 32e is formed with a bolt hole 32e1.

Referring back to FIG. 4, the transverse reinforcing member 34 is a metal member and comprises two flange portions 34a, two raised portions 34b raised from inner ends of the two flange portions 34a and an intermediate major portion 34c extending between upper ends of the two raised portions 34b. Thus, the transverse reinforcing member 34 has generally a flattened Ω-shaped structure. As shown, the flange portions 34a of the transverse reinforcing member 34 are secured via welding to the junction portions 32f of the right and left reinforcing members 32. For assuring the connection of the flange portions 34a with the junction portions 32f, each flange portion 32f has a stepped recess into which the junction portion 32f is tightly received and secured thereto by means of a fillet welding.

As is understood from FIG. 2, the flattened front ends 32d of the right and left reinforcing members 32 are secured to the lower walls 10c of the front frame 10F through respective bolts 40. That is, as is seen from the drawing, each bolt 40 passes through the bolt hole 32d1 (see FIG. 4) of the flattened front end 32d and the bolt hole of the lower wall 10c and fastened by a nut.

As is understood from FIGS. 1, 2 and 3, the flattened rear ends 32e of the right and left reinforcing members 32 are secured through bolts 42 to lower walls of axially opposed ends of the front member 16. That is, as is seen in FIG. 2, each bolt 42 passes through the bolt hole 32e1 (see FIG. 4) and a bolt hole of the front member 16 and is fastened by a nut.

Thus, as is understood from FIG. 4, the reinforcing structure 30 is arranged between the front frame 10F of the vehicle body and the front member 16 of the front suspension structure 12.

As is shown in FIG. 2, upon assembly of the reinforcing structure 30, the right and left reinforcing members 32 are inclined with respect to horizontal axes of the right and left side frames 10R and 10L. The inclination is so made that the flattened front ends 32d of them 32 are positioned higher than the flattened rear ends 32e.

In the following, various advantages given by the present invention will be described with reference to the drawings.

When, as is seen from FIG. 1, the front member 16 is applied with a certain external force "N2" from a front direction due to bumping against projected things on a road, the right and left reinforcing members 32 are stretched. This stretching produces a reaction force "F2" (see FIG. 2) applied to the front member 16. Thus, the front member 16 and the side members 14 are suppressed from making rearward deformation.

When, as is seen from FIG. 1, the front member 16 is applied with a certain external force "N3" from a front left direction, the transverse reinforcing member 34 is compressed. This compression of the member 34 produces a reaction force "F3" applied to the front member 16 through the left reinforcing member 32. Thus, the front member 16 and the side members 14 are suppressed from making rearward deformation. Similar advantageous operation takes place also when the front member 16 is applied with such external force from a front right direction.

As is described hereinabove, when the front member 16 is applied with a certain external force due to bumping against projected things on a road, the reinforcing structure 30 functions to suppress or at least minimize the undesired deformation of the front member 16 and the side members 14. Considering the fact in which the rack 22d2 of the steering gear 22d is mounted on the front member 16, suppression of deformation of the front member 16 minimizes the possibility of failure of the steering device 22. That is, due to provision of the reinforcing structure 30, the front suspension structure of the invention is assuredly reinforced.

Furthermore, when, as is shown in FIG. 2, the front frame 10F of the vehicle body is applied with a marked impact force "S" due to a vehicle head-on collision or the like, the right and left reinforcing members 32 of the reinforcing structure 30 function to absorb the impact force. That is, when, due to the collision, the impact force "S" is transmitted to the reinforcing members 32 through the front frame 10F and the respective lower walls 10c of the frame 10F, each reinforcing member 32 is forced to bend at a portion near the point "B1". Bending of the reinforcing members 32 absorbs the impact force "S". It is to be noted that due to the bending of the reinforcing members 32, the impact shock has no effect on the front suspension structure 12.

Because of the inclination with which the reinforcing structure 30 extends between the front frame 10F and the front member 16, the shock absorbing portion (viz., the portion subjected to bending) of each reinforcing member 32 can be positioned remote from the road surface leaving a large clearance between the shock absorbing portion and the road surface. This minimizes the possibility of collision of the shock absorbing portion with projected things on the road.

As is described hereinabove, due to provision of the reinforcing structure 30, two advantageous operations are assured. That is, undesired deformation of the front suspension structure, which would occur upon bumping of the front member 16 against projected things on the road, is assuredly suppressed, and an impact force applied to the front frame 10F, which would be produced upon a vehicle head-on collision, is assuredly absorbed.

What is claimed is:

1. In a motor vehicle having a laterally extending front frame, right and left side frames which respectively extend rearward from laterally opposed ends of said front frame, and a steering device by which front road wheels are steered, a combination comprising:

a front suspension structure arranged behind said front frame and located between said right and left side frames, said front suspension structure including a front member which extends between said right and left side frames, said front member having a steering gear of said steering device mounted thereon; and a reinforcing structures, extending between said front frame and said front member and having front and rear ends secured to said front frame and said front member respectively, to reinforce said front suspension structure against an external force applied to said front member.

2. A combination as claimed in claim 1, in which said reinforcing structure comprises:

right and left reinforcing members which extend between said front frame and said front member; and a transverse reinforcing member extending transversely between said right and left reinforcing members.

3. A combination as claimed in claim 2, in which each of said right and left reinforcing members is inclined with respect to a horizontal axis of each of said right and left side frames.

4. A combination as claimed in claim 3, wherein each of said right and left reinforcing members has a front and rear end, and wherein each of the reinforcing members is so inclined that a front end is positioned higher than a rear end.

5. A combination as claimed in claim 4, wherein said right and left reinforcing members are angled to each other so that a distance between said right and left reinforcing members at their respective front ends is greater than a distance between said right and left reinforcing members at their respective rear ends.

6. A combination as claimed in claim 5, in which each of said right and left reinforcing members is of a tubular metal member.

7. A combination as claimed in claim 6, in which each of said right and left reinforcing members comprises:

a tubular major portion;

a pressed front portion which is secured to said front frame; and a pressed rear portion which is secured to said front member.

8. A combination as claimed in claim 7, in which said pressed front and rear portions are angled relative to said tubular major portion in such a manner that said pressed front and rear portions extend in parallel with each other.

9. A combination as claimed in claim 8, in which the pressed front portion of each of said right and left reinforcing members has a flattened front end which is secured via a bolt to a lower wall of said front frame, and in which the pressed rear portion of each of said right and left reinforcing members has a flattened rear end which is secured via a bolt to a lower wall of said front member.

10. A combination as claimed in claim 1, in which said front suspension structure further includes:

right and left side members which extend along said right and left side frames and secured thereto respectively, each side member having a front lower portion to which a lateral end of said front member is secured; and right and left lower links which extend rearward from lateral ends of said front member to rear ends of said right and left side members.

* * * * *